(12) United States Patent
Takatsuki et al.

(10) Patent No.: US 7,666,497 B2
(45) Date of Patent: Feb. 23, 2010

(54) METALLICALLY DECORATED SHEET AND METALLICALLY DECORATED SHEET INTERMEDIATE

(75) Inventors: Hirotsugu Takatsuki, Tokyo (JP); Chikatsu Akisada, Tokyo (JP)

(73) Assignee: Japan Wavelock Co., Ltd., Tokyo (JP)

( * ) Notice: Subject to any disclaimer, the term of this patent is extended or adjusted under 35 U.S.C. 154(b) by 0 days.

(21) Appl. No.: 10/236,283

(22) Filed: Sep. 6, 2002

(65) Prior Publication Data

US 2003/0190485 A1 Oct. 9, 2003

(30) Foreign Application Priority Data

Mar. 26, 2002 (JP) .............................. 2002-085784
May 15, 2002 (JP) .............................. 2002-139960

(51) Int. Cl.
*B32B 15/08* (2006.01)
(52) U.S. Cl. ..................... 428/337; 428/332; 428/336; 428/409; 428/457; 428/458
(58) Field of Classification Search .............. 428/457, 428/458, 461, 40.1, 40.9, 41.7, 41.8, 42.1, 428/343, 344
See application file for complete search history.

(56) References Cited

U.S. PATENT DOCUMENTS

| | | | | |
|---|---|---|---|---|
| 3,753,769 A | * | 8/1973 | Steiner ..................... | 428/331 |
| 4,351,881 A | * | 9/1982 | Kamada et al. ........... | 428/412 |
| 4,403,004 A | * | 9/1983 | Parker et al. .............. | 428/31 |
| 4,847,329 A | * | 7/1989 | Koleske et al. ............ | 525/162 |
| 4,865,908 A | * | 9/1989 | Liu et al. ................... | 428/461 |
| 5,276,600 A | * | 1/1994 | Takase et al. .............. | 362/320 |
| 5,470,908 A | * | 11/1995 | Schmidt et al. ............ | 524/520 |
| 5,679,458 A | * | 10/1997 | Cho et al. .................. | 428/412 |
| 5,773,112 A | * | 6/1998 | Tachikawa et al. ........ | 428/40.1 |
| 5,804,287 A | * | 9/1998 | Hatakeyama et al. ...... | 428/220 |
| 6,013,749 A | * | 1/2000 | Baba et al. ................. | 526/279 |
| 6,287,672 B1 | * | 9/2001 | Fields et al. ............... | 428/209 |
| 6,455,138 B1 | | 9/2002 | Murano | |
| 6,503,635 B1 | * | 1/2003 | Kong et al. ................ | 428/461 |
| 6,638,606 B2 | * | 10/2003 | Yoshihara et al. ......... | 428/206 |
| 6,676,799 B2 | * | 1/2004 | Eshbach et al. ............ | 156/324 |
| 6,727,334 B2 | * | 4/2004 | Nishiwaki et al. ......... | 526/240 |
| 6,761,793 B2 | | 7/2004 | Murano | |
| 6,942,911 B2 | * | 9/2005 | Nakayama ................. | 428/40.9 |
| 2002/0036368 A1 | | 3/2002 | Murano | |
| 2002/0108708 A1 | | 8/2002 | Murano | |
| 2003/0026932 A1 | * | 2/2003 | Johnson et al. ............ | 428/40.1 |

FOREIGN PATENT DOCUMENTS

JP          10-180795          7/1998

* cited by examiner

Primary Examiner—Monique R Jackson
(74) Attorney, Agent, or Firm—Brinks Hofer Gilson & Lione (57) ABSTRACT

A metallically decorated sheet is provided, by which the cost down in production is possible, a relatively deep drawing can be carried out without a problem upon molding, the design performances are improved, and good scratch resistance can be attained. The metallically decorated sheet includes in the following sequence: a transparent or translucent surface film layer; a first adhesive layer; a transparent or translucent holding film layer for holding a metallic layer; the metallic layer; a second adhesive layer; and a base film layer.

7 Claims, 2 Drawing Sheets

METALLICALLY DECORATED SHEET AND METALLICALLY DECORATED SHEET INTERMEDIATE

BACKGROUND OF THE INVENTION (1) Field of the Invention

The present invention relates to a metallically decorated sheet, which adds metallic appearance to a, surface of a resin product or resin part such as an interior or exterior decor of a motor vehicle, furniture, building material, bag, household appliances, audio, personnel computer, portable telephone, personnel digital assistant (PDA), camera, video camera, signboard, display, name plate, architrave, amusement product such as pinball machine and slot machine, cosmetic case, jewel, tableware, and toy.

(2) Description of the Related Art

A molded product having a metallic appearance on its surface, which is produced by inserting a metallically decorated sheet into a mold upon molding of a molded resin, can replace an ordinary metallic material with maintaining a feeling of quality and at the same time attain the process saving, decrease in the cost, and weight saving. Consequently, the metallically decorated sheet meets the current demand and various technologies have been proposed mainly in the field of non-structural parts.

Figure 4:
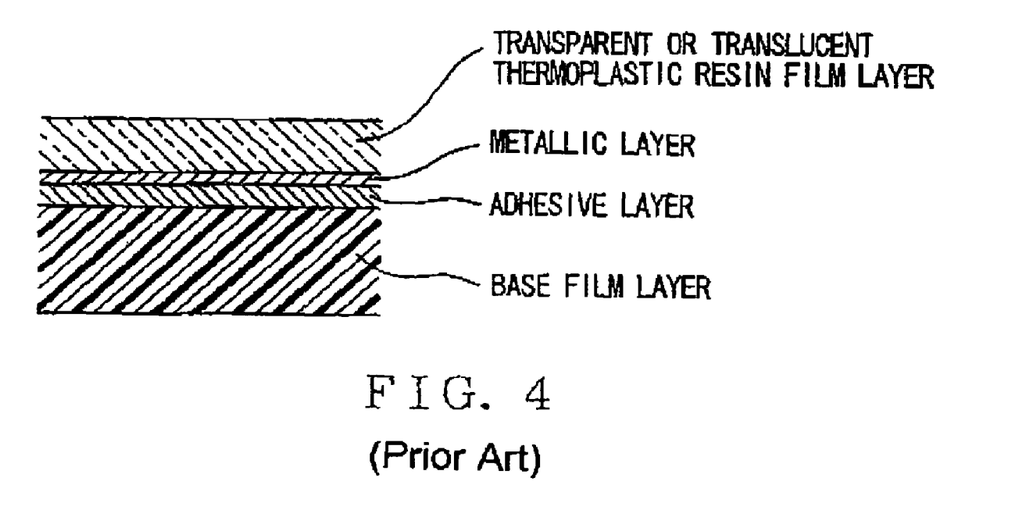
FIG. 4 is a schematic cross sectional view of an ordinary metallically decorated sheet.

A general structure of a metallically decorated sheet is schematically illustrated in FIG. 4. A metallic layer is formed on one side of a transparent or translucent thermoplastic resin film by using vacuum-applied technology such as vacuum evaporation method, sputtering method and ion plating method, and a film having the metallic layer is stuck to a thermoplastic resin film as the base film putting an adhesive layer therebetween, thereby the metallically decorated sheet is produced.

For the purpose of protecting the metallic layer, an extremely thin film can not be used as the transparent or translucent thermoplastic resin film.

A cost of forming the metallic layer accounts for a main part of the production cost of the metallically decorated sheet. The greater part of the cost of forming the metallic layer is attributed to a cost of setup processes.

The formation of the metallic layer by using the vacuum-applied technology has been carried out by a kind of batch process.

That is, one batch process includes three steps of: a first setup step in which a roll of material film (generally, 100-200 μm in thickness), vapor source and winding shaft for winding a deposited film are set up in a vacuum chamber, and thereafter the vacuum chamber is closed and decompressed so as to attain a degree of vacuum sufficient enough for the process; a step in which the metallic layer is formed on one side of the film with feeding the film; and a second setup step in which the decompression is removed, the deposited film roll is taken out, and the interior of the vacuum chamber is cleaned.

Since the step for forming the metallic layer can be carried out with a rate of 200-300 meters/minute in case of the vacuum evaporation method, therefore this step can be finished within about several minutes to ten minutes per one roll (1000-2000 meters per one roll).

In contrast, a total period of time required for the setup steps including the first and second setup steps is several tens times as long as the period of time required for the step for forming the metallic layer. Especially in a case of the vacuum evaporation of a special metal such as indium, which enables deep drawing upon molding, not like a normal metal such as aluminum, the total period of time described above becomes even longer.

Since the work in the setup steps is mainly carried out by hand, therefore it accounts for almost all of the cost of forming the metallic layer. However, the setup steps can hardly be simplified easily and the cost of the setup steps can hardly be reduced easily.

A metallically decorated sheet has to be improved in design and scratch resistance.

Regarding the design, etching processing, hair-line finish or so-called "sand-mat processing" can be applied solely or in combination to a surface of a transparent or translucent thermoplastic resin film, which is to form a metallic layer, at the metallic layer side, thereby the design can be improved freely. However, when the metallic layer is formed on the surface subjected to such a processing described above, adhesion property between the metallic layer and the resin film deteriorates, resulting in that the metallic layer peels off from the resin film, for example, upon molding, thereby a defective product arises. Here, although the processing described above can be applied to the opposite side of the resin film, to which the metallic layer is not formed, the effect of such a processing is easily lost on account of friction in this case.

An acrylic resin film may be employed as the transparent or translucent thermoplastic resin film so as to obtain a sufficient improvement in scratch resistance. However, in case of acrylic resin film, the resin film has too low tear strength to be handled well, resulting in that an accident such as a rupture takes place upon formation of the metallic layer, that is, a stable production is difficult.

Further, an acrylic resin film has a poor adhesion property with the metallic layer causing a peeling of the metallic layer, for example, upon molding and therefore, causing a defective product. When indium, in which a deep drawing can be carried out in comparison with aluminum, is employed as a metal to compose the metallic layer, the adhesion property of the metallic layer with an acrylic resin film is poorer than that in the case of aluminum, that is, the resulted product may have many defective portions where no metallic luster can be seen.

A metallically decorated sheet has been investigated, in which by using a polyolefin film or polyester film the metallic layer is formed on one side followed by laminating it onto the base film. However, the polyolefin film or polyester film has low scratch resistance causing a flaw arising on a surface of the molded product molded by using the metallically decorated sheet. Further, when the polyolefin film or polyester film is employed, the molding property deteriorates, therefore a molded product can not be obtained, in which the expressivity of details of the molded product is excellent.

Then, a hard coating layer by using a hard coating agent is formed on a metallically decorated surface of a molded product or an intermediate molded product, in which a metallically decorated sheet is molded by heat forming method such as vacuum forming. The surface hardness of the product is improved as a result. Here, the intermediate molded product is defined as a matter, which is in advance formed in a shape of the inner walls of the cavity of the mold or in a similar shape by using heat forming and so on, and is further to be inserted into a mold as an insert upon injection molding of the molded product and becomes integral with the molded product after the molding of the molded product. In this specification, both of a molded product and an intermediate molded product are called molded product.

The hard coating layer described above is several to several tens μm in thickness. A hard coating agent dissolved in an appropriate solvent or an emulsion of a hard coating agent is prepared, then it is applied onto a surface of the molded product or intermediate molded product by using spray-coating method or immersion-coating method and then, the hard coating layer is formed being cured by heating method or ultraviolet irradiation method.

However, the hard coating layer causes various problems as shown below:

(1) Equipment for spray-coating, immersion-coating, ultraviolet irradiation or heating is necessary.

(2) In the coating process, dust or dirt tends to adhere to the film causing deterioration in yield. A special and expensive facility such as a clean room may be necessary.

(3) The hard coating process has to be carried out not by a continuous process but by a batch process per molded product, causing the necessity of time, deterioration in productivity and a great deal of material loss.

(4) A uniform formation of the hard coating layer is difficult, that is, non-uniform surface hardness and spots in appearance for the product tend to result. Especially, in a case that the shape of the surface of the molded product, onto which the hard coating layer is to be formed, is complicated, a uniform hard coating layer actually can not be attained.

(5) The stock, conveyance and control for the molded product, to which the hard coating is to be applied, require a cost.

(6) The hard coating layer is formed on a portion (e.g. the back side) where the coating is unnecessary. For a portion to which the coating must not be applied, the masking becomes necessary before the coating, causing the necessity of time and a cost.

(7) When the hard coating agent of ultraviolet curing-type is employed, the hard coating layer has poor weather resistance. On the other hand, when the hard coating agent of thermoplastic type is employed, the molded product may possibly be heat-deformed, curved or twisted. Therefore, the hard coating agent must be selected according to the purpose, shape and resin to be used.

Furthermore, in addition to the primary effect of giving a metallic appearance, the metallically decorated sheet is required to have good scratch resistance or various design performances (including color) at the same time. Therefore, the production of the metallically decorated sheet tends to be a type of many varieties and small amount of production, causing the problem in control of the stock and that in a cost.

SUMMARY OF THE INVENTION

It is therefore an objective of the present invention to solve the above problems and to provide a metallically decorated sheet, by which the cost down in production is possible, a relatively deep drawing can be carried out without a problem upon molding, the design performances are improved and the expressivity of details of the molded product is excellent, and good scratch resistance can be attained.

It is another objective of the present invention to provide a metallically decorated sheet intermediate, which enables the cost down in the production of the metallically decorated sheet and can solve the problem in control of the stock and that in a cost.

In order to attain the above objective, the present invention is to provide a metallically decorated sheet comprising in the following sequence:

a transparent or translucent surface film layer;
a first adhesive layer;
a holding film layer having a metallic layer formed on at least one side thereof;
a second adhesive layer; and
a base film layer.

With the construction described above, the surface film layer can provide performances required as the surface of the molded product such as scratch resistance and design performance of the metallically decorated sheet, the holding film holding a metal layer can be significantly thin compared with an ordinary film, the length of one roll which can be entered in a vacuum chamber per one setup step upon formation of the metallic layer can therefore be significantly enlarged, and thus the cost of forming the metallic layer, which accounts for a main part of the production cost of the metallically decorated sheet, can be reduced to ½-⅕ times as much as an ordinary cost of forming the metallic layer. Therefore, although the metallically decorated sheet of the present invention has the constitution that the number of the film layer and that of the adhesive layer are increased by one, respectively, compared with an ordinary metallically decorated sheet, it enables a production cost down compared with an ordinary metallically decorated sheet.

Further, since a film well adherable to the metal can be employed as the holding film holding a metal layer without taking other performance such as scratch resistance into consideration, therefore the adhesion property between the metallically decorated sheet and the metal can be improved. The film consisting the surface film layer can be selected freely, without consideration of its adherability with metallic part, providing a wider option for a film which may be excellent in scratch resistance and in the expressivity of details of the molded product, or a film which may be processed to give a good design performance. Therefore, as a result, the metallically decorated sheet of the present invention has every advantage described above without applying a high-cost hard coating process for improving the scratch resistance. Even when a molding with significantly deep-drawing is carried out, since there is no occurrence of portion where the scratch resistance deteriorates, therefore the degree of freedom for molding is significantly improved.

The present invention provides a metallically decorated sheet intermediate comprising in the following sequence:

a transparent or translucent holding film layer;
a metallic layer;
an adhesive layer; and
a base film layer.

With the construction of the metallically decorated sheet intermediate described above, the metallically decorated sheet of the present invention can be easily produced.

The metallically decorated sheet intermediate described above can be produced in a lot in advance and then, the metallically decorated sheet intermediate can simply be adhered to a surface film layer, which is adjusted in terms of various performances (e.g. scratch resistance, design and color) according to the demand from a customer. That is, there is no need to prepare a variety of metallically decorated sheets in order to meet every demand from customers, therefore the time for controlling the stock, a cost of stock and a risk of stock can be significantly reduced.

DESCRIPTION OF THE PREFERRED EMBODIMENTS

In the metallically decorated sheet of the present invention, the surface film layer consists of thermoplastic resin and must be transparent or translucent so that the metal layer situated below can be seen. The surface film layer may be added with various dyes or pigments so as to be adjusted in terms of transparency and color, and may be colored with a dye.

A surface film for constituting the surface film layer may be subjected to be printed in advance. In such a case, the printing is preferably carried out on the side of the film at the adhesive layer-side from the viewpoint of durability of the print.

An etching processing, hair-line finish or sand-mat processing may be applied solely or in combination to the surface of the surface film. The processing described above is preferably applied on the surface of the surface film at the adhesive layer-side from the viewpoint of durability of the processing.

The surface film is preferably made of acrylic resin such as polymethyl methacrylate for a reason that a molded product, in which the expressivity of details of the molded product and scratch resistance is excellent, can be obtained. Thereby, an excellent moldability can be attained, no hard coating layer is needed onto the final molded product after molding, the cost reduction can be attained, many problems due to the drawback of the hard coating layer do not arise, and even when the present invention is applied to a molded matter of significantly deep-drawing, high scratch resistance can be attained for the whole surface.

If one would like to add an excellent weather resistance to the molded product besides the effect described above obtained when acrylic resin film is employed, one can employ an alloy film consisting of fluorine resin and acrylic resin or two-layer film consisting of fluorine resin layer and acrylic resin layer.

However, when the alloy film containing fluorine resin is employed, one may have a problem of deterioration in adhesion property. In such a case, if one would like to attain a good adhesion property, one can employ a composite alloy film consisting of: an alloy film layer of fluorine resin component-rich fluorine resin and acrylic resin; and an alloy film layer of fluorine resin component-poor fluorine resin and acrylic resin, and an adhesive layer is formed at the side of the alloy film layer of fluorine resin component-poor fluorine resin and acrylic resin, thereby a good weather resistance together with good adhesion property can be attained.

When one employs acrylic resin film as the surface film, one can obtain good scratch resistance, thereby one can use a relatively thin film, being able to cope with a molded product having complicated unevenness and small curvature radius, thereby the expressivity of details of the molded product can be improved.

The surface film layer is preferably equal to or more than 10 μm in thickness in terms of scratch resistance and more preferably equal to or more than 25 μm in thickness. On the other hand, it is preferably equal to or less than 200 μm in thickness in terms of moldability, flexibility and economy, and more preferably equal to or less than 100 μm in thickness to cope with a molded product having small curvature radius and complicated unevenness.

The adhesive layer set between the surface film layer and the holding film layer must be transparent or translucent so that the metal layer situated below can be seen. The adhesive layer may be added with various dyes or pigments to adjust the transparency and color. The adhesive layer may be added with metal powder, metal foil powder or mica.

The adhesive, which constitutes the adhesive layer in the present invention, can be selected among adhesives having sufficient adhesion strength, weather resistance according to needs and heat resistance at least to stand the heat upon molding. In general, polyurethane adhesive can be used as the adhesive.

The adhesive layer set between the surface film layer and the holding film layer is normally from 2 μm to 20 μm in thickness.

The holding film layer must have a metallic layer at least on one side thereof. The holding film layer may have a metallic layer on both sides thereof.

Preferably, in terms of coping with a small lot and stock control, the holding film layer is transparent or translucent and has a metallic layer on one side thereof, and the metallic layer is formed on a surface near to the base film layer of the holding film layer, so that the metallically decorated sheet can be produced through a metallically decorated sheet intermediate explained later on.

Figure 1:
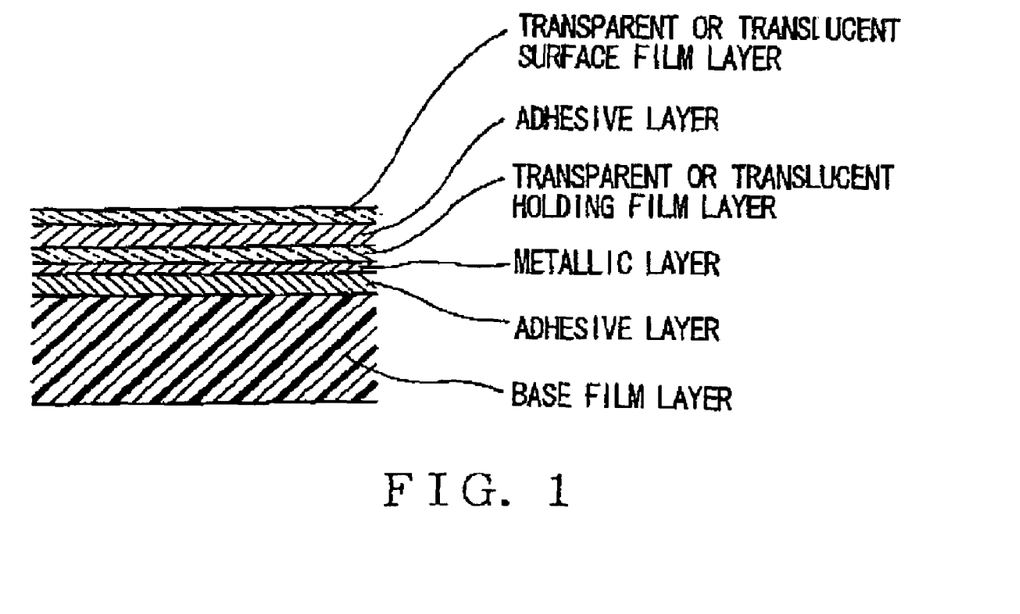
FIG. 1 is a schematic cross sectional view of a metallically decorated sheet of the present invention.

Consequently, in the following, mainly explained will be the metallically decorated sheet shown in FIG. 1 comprising in the following sequence: a transparent or translucent surface film layer; a first adhesive layer; a transparent or translucent holding film layer; a metallic layer; a second adhesive layer; and a base film layer.

The holding film layer consists of thermoplastic resin, has a good adhesion property with metal, and, must be transparent or translucent so that the metallic layer set below can be seen. In order to improve the adhesion property of the holding film layer with the metallic layer, an etching processing, hair-line finish or sand-mat processing is not preferably applied to the surface for forming the metallic layer of the holding film. When such a processing is applied solely or in combination to the holding film, such a processing is preferably applied to the surface near to the surface film layer of the holding film.

Preferably, the holding film is polyester film or polyolefin film in terms of the adhesion property with metal. As a result of a preparative examination, the adhesiveness between a polyethylene terephthalate film and a deposited layer of aluminum is five times as high as the adhesiveness between a polymethyl methacrylate film and a deposited layer of aluminum.

Polyolefin resin constituting the polyolefin film used as the holding film is, for example, polypropylen and polyethylene (low density or high density).

Normal polyethylene terephthalate can be used as the polyester film. In terms of moldability, especially for coping with a molded product of deep drawing, preferably the polyester film consists of a film made of amorphous polyethylene terephthalate (so-called APET) or modified polyethylene terephthalate, that is, polyester polymer compound having benzene ring and naphthalene ring in main chain or polyester polymer compound having benzene ring and cyclohexane ring in main chain.

One example of such a polyester polymer compound having benzene ring and cyclohexane ring in main chain is shown by chemical formula (1), wherein m and n are natural numbers. When such a polyester polymer compound having benzene ring and cyclohexane ring in main chain is employed, the final molded product has a vivid metallic luster, and fading or whitening does not arise even at a corner having very small curvature radius of the molded product.

chromium, titanium, platinum, indium, alloys such as aluminum alloy, stainless steel and hastelloy, and silicon according to the feel of a material of metal desired. In general, aluminum or aluminum alloy is employed.

The metallic layer is normally 10-200 nm in thickness in order to stand various processings and preferably 20-100 nm when a deep drawing is carried out.

(1)

A transparent thermoplastic resin consisting of such a polyester polymer compound having benzene ring and cyclohexane ring in main chain can be obtained in the form of pellet type, and is processed to be a film by calendering method, extrusion method or other known methods, thereby obtaining a transparent thermoplastic resin film consisting of polyester polymer compound having benzene ring and cyclohexane ring in main chain.

On the other hand, when the holding film consists of a polyester polymer compound having benzene ring and naphthalene ring in main chain, which is shown by chemical formula (2) as an example, the final molded product can have excellent metal deposition performance, moldability, light resistance and chemical resistance. Further, the final molded product has a vivid metallic luster, and fading or whitening does not arise even at a corner having very small curvature radius of the molded product. Furthermore, since the thickness of the film can easily be thin compared with a normal film, therefore the productivity can be improved, the production cost can be reduced, and the metallic luster can easily be given to a surface having a complicated shape.

The thermoplastic resin film is adhered to the surface near to the metallic layer of the holding film putting the adhesive layer therebetween.

As the adhesive for the adhesive layer described above, an adhesive used in an ordinary metallically decorated sheet can be employed. Because the adhesive hardly affects the feel of a material and color of the final molded product and a consideration in weather resistance is not specially required for the adhesive since the adhesive is protected by the surface film layer and the holding film layer, therefore the adhesive has relatively high degree of selection, in which the adhesive having high adhesion strength and low cost can be selected. One example for the adhesive may be a urethane adhesive of yellow discoloration-type, which has been difficult to be applied in the present technical field in spite of its low cost. The thickness of the adhesive layer is preferably the same as that of the adhesive layer set between the surface film layer and the holding film layer.

As the base film layer, a film used for a base film layer of an ordinary metallically decorated sheet may be employed.

(2)

In terms of obtaining high productivity and sufficient cost-down effect, preferably the holding film layer is as thin as possible so as to enlarge the length per one roll as long as possible. The holding film layer is equal to or less than 100 μm in thickness, preferably equal to or less than 40 μm, and more preferably equal to or less than 25 μm. The lower limit of the thickness is 3 μm and preferably 5 μm to secure the formation of the metallic layer and the handling thereafter.

The metallic layer is formed on one side of the holding film by using thin film formation technique applying vacuum technology such as vacuum evaporation method, sputtering method, ion plating method and plasma CVD (chemical vapor deposition) method.

A metal constituting the metallic layer can be selected from elements such as aluminum, zinc, gallium, nickel, tin, silver, An example of material for such a film is acrylonitrile-butadiene-styrene copolymer, polypropylen, polycarbonate, polystyrene or polyvinyl chloride. It can be selected according to the resin of the molded product, which is molded with the metallically decorated sheet. The base film layer in the present invention includes a thick film layer, for example, having 500 μm thickness, which is normally classified into a sheet.

The metallically decorated sheet can be produced continuously from the first step to the last step. Instead, the following method can be employed. That is, a metallically decorated sheet intermediate comprising in the following sequence: a transparent or translucent holding film layer; a metallic layer; an adhesive layer; and a base film layer, is produced in a lot in advance and then, the metallically decorated sheet intermediate can simply be adhered to the surface film layer, which is adjusted in terms of various performances (e.g. scratch resistance, design, color and pattern) according to the demand from a customer. In this method, there is no need to prepare a variety of metallically decorated sheets in order to meet every demand from customers, therefore the time for controlling the stock, a cost of stock and a risk of stock can be significantly reduced. Further, the rapid response to needs and reduction in production cost becomes possible.

In the metallically decorated sheet intermediate, if the metallic layer is exposed to the surface-side of the holding film layer, the metallic layer possibly might be damaged during handling, peel off or discolor. Therefore, the metallically decorated sheet intermediate must be constructed by the transparent or translucent holding film layer; the metallic layer; the adhesive layer; and the base film layer in the sequence described above.

EXAMPLES

In the following, the metallically decorated sheet of the present invention will be explained with examples.

(Metallically Decorated Sheet A of the Present Invention)

As the transparent holding film, a 6000 m roll of 25 μm-thickness film consisting of polyester polymer compound having benzene ring and naphthalene ring in main chain (commercial name "Teflex" manufactured by Teijin Dupont Films Japan Limited; hereinafter, modified PET) was set in a vacuum evaporator, then a vacuum evaporation was carried out on one side of the film so as to obtain the metallic layer of aluminum having 50 nm-thickness and then, the film was taken out.

The roll was 60 cm in diameter, which was about the maximum diameter that could be set in the vacuum evaporator used. In a case of 125 μm-thickness film, a roll having the maximum diameter, which could be set in the vacuum evaporator, was a 1000 m roll.

The period of time required for a series of the evaporation process including the first setup step, metallic layer-formation step and second setup step was 1.3 times as long as a period of time required for an ordinary process for producing a 125 μm-thickness film.

A base film layer (a sheet made of acrylonitrile-butadiene-styrene copolymer; hereinafter, ABS) having 250 μm-thickness was laminated on the metallic layer-side of the holding film including the metallic layer through an urethane adhesive layer (5 μm-thickness), thereby a metallically decorated sheet intermediate of the present invention was produced.

A surface film layer (made of polymethyl methacrylate; hereinafter, PMMA; pencil hardness 3H) having 75 μm-thickness was laminated on a surface of the metallically decorated sheet intermediate at the holding film-side through an urethane adhesive layer (5 μm-thickness), thereby a metallically decorated sheet A of the present invention was produced.

(Metallically Decorated Sheets B to H of the Present Invention)

Metallically decorated sheets B to H of the present invention, the compositions of which are shown in Tables 1A and 1B, were produced by a process similar to the process for producing the metallically decorated sheet A of the present invention described above except the points: that polymethyl methacrylate-polyvinylidene fluoride alloy (hereinafter, PMMA-PVDF) film or a milled delustered resin film (hereinafter, delustered PMMA; a metallically decorated sheet, which can give the feel of a material of alumite to a final molded product, being produced) consisting of polymethyl methacrylate in which rubber polymers are compounded was employed as the surface film depending on the examples instead of a film made of polymethyl methacrylate; that an indium layer (hereinafter, In) made of indium was employed as the metallic layer depending on the examples instead of an aluminum layer (hereinafter, Al); and that a film made of cast polypropylen (hereinafter, CPP) was employed as the holding film depending on the examples instead of a film made of amorphous polyethylene terephthalate.

(Ordinary Metallically Decorated Sheet I: Comparative Example)

As a surface film having a metallic layer, employed was a transparent film (125 μm-thickness) consisting of polyester polymer compound having benzene ring and naphthalene ring in main chain having a 50 nm-thickness aluminum layer on one side thereof. A 250 μm-thickness base film made of ABS was laminated on the transparent film described above at the aluminum layer-side through an urethane adhesive layer (5 μm-thickness), thereby an ordinary metallically decorated sheet I was produced.

(Ordinary Metallically Decorated Sheets J to N: Comparative Examples)

Ordinary metallically decorated sheets J to N, the compositions of which are shown in Tables 2A and 2B, were produced by a process similar to the process for producing the ordinary metallically decorated sheet I described above except the points: that a film made of polymethyl methacrylate, a delustered PMMA film produced by applying a hair-line finish to one side of a film (rubber polymer being added as a filler) made of polymethyl methacrylate having 50 μm-thickness, total transmittance 95%, diffuse transmittance 54%, haze 57% and degree of brilliancy 18% or a film (hereinafter, delustered colored PMMA) produced by further coloring the delustered PMMA by using an aqueous disperse dye was employed as the surface film forming the metallic layer depending on the examples instead of a film consisting of polyester polymer compound having benzene ring and naphthalene ring in main chain; and that an indium layer made of indium was employed as the metallic layer depending on the examples instead of an aluminum layer. Metal was deposited on the surface of the delustered PMMA film, on which the hair-line finish is applied, thereby the metallic layer was formed.

TABLE 1A

| Metallically decorated sheet | Surface film | | Holding film | | Material of metallic layer | Base film | |
|---|---|---|---|---|---|---|---|
| | Material | Thickness (μm) | Material | Thickness (μm) | | Material | Thickness (μm) |
| A | PMMA | 75 | modified PET | 25 | Al | ABS | 250 |

TABLE 1A-continued

| Metallically decorated sheet | Surface film Material | Surface film Thickness (μm) | Holding film Material | Holding film Thickness (μm) | Material of metallic layer | Base film Material | Base film Thickness (μm) |
|---|---|---|---|---|---|---|---|
| B | PMMA | 75 | modified PET | 25 | In | ABS | 250 |
| C | PMMA-PVDF | 40 | modified PET | 25 | Al | ABS | 250 |
| D | PMMA-PVDF | 40 | modified PET | 25 | In | ABS | 250 |
| E | PMMA | 75 | CPP | 12 | Al | ABS | 250 |
| F | PMMA | 75 | CPP | 12 | In | ABS | 250 |
| G | delustered PMMA | 50 | modified PET | 25 | Al | ABS | 250 |
| H | delustered colored PMMA | 50 | modified PET | 25 | Al | ABS | 250 |

TABLE 1B

| | | Results of Evaluation | | | | | | | |
|---|---|---|---|---|---|---|---|---|---|
| Metallically decorated sheet | Adhesion property of metallic layer | Moldability Mold α | Moldability Mold β | Appearance Mold α | Appearance Mold β | Weather resistance | Chemical resistance | Surface hardness | Scratch resistance |
| A | G1 | G1 | G1 | G1 | G2 | G2 | G2 | 2H | G2 |
| B | G1 | G1 | G1 | G1 | G1 | G1 | G2 | 2H | G2 |
| C | G1 | G1 | G1 | G1 | G2 | G2 | G1 | H | G2 |
| D | G1 | G1 | G1 | G1 | G1 | G1 | G1 | H | G2 |
| E | G2 | G1 | G1 | G1 | G2 | G2 | G2 | 2H | G2 |
| F | G2 | G1 | G1 | G1 | G1 | G1 | G2 | 2H | G2 |
| G | G1 | G1 | G1 | G1 | G2 | G2 | G2 | F | G2 |
| H | G1 | G1 | G1 | G1 | G2 | G2 | G2 | F | G2 |

TABLE 2A

| Metallically decorated sheet | Surface film Material | Surface film Thickness (μm) | Material of metallic layer | Base film Material | Base film Thickness (μm) |
|---|---|---|---|---|---|
| I | modified PET | 100 | Al | ABS | 250 |
| J | modified PET | 100 | In | ABS | 250 |
| K | PMMA | 125 | Al | ABS | 250 |
| L | PMMA | 125 | In | ABS | 250 |
| M | delustered PMMA | 50 | Al | ABS | 250 |
| N | delustered colored PMMA | 50 | Al | ABS | 250 |

TABLE 2B

| | | Results of Evaluation | | | | | | | |
|---|---|---|---|---|---|---|---|---|---|
| Metallically decorated sheet | Adhesion property of metallic layer | Moldability Mold α | Moldability Mold β | Appearance Mold α | Appearance Mold β | Weather resistance | Chemical resistance | Surface hardness | Scratch resistance |
| I | G1 | G2 | G3 | G1 | G2 | G2 | G1 | B | G4 |
| J | G1 | G2 | G3 | G1 | G1 | G1 | G1 | B | G4 |
| K | G3 | G1 | G2 | G2 | G3 | G2 | G2 | 2H | G2 |
| L | G4 | G1 | G2 | G3 | G3 | G1 | G2 | 2H | G2 |
| M | G3 | G1 | G1 | G2 | G3 | G2 | G2 | F | G2 |
| N | G4 | G1 | G1 | G3 | G3 | G2 | G2 | F | G2 |

(Evaluation of the Metallically Decorated Sheet)

As for the metallically decorated sheets A to N described above, the adhesion property of the deposited metallic layer, moldability, appearance of the molded product after molding, weather resistance, chemical resistance, surface hardness and scratch resistance were evaluated.

[Adhesion Property of the Deposited Metallic Layer]

The adhesion strength was investigated as the adhesion property. That is, the adhesion strength of the interface between the holding film layer and the metallic layer was measured in accordance with JIS K6854. The measured adhesion strength was classified into four grades form G1 to G4. That is, when the strength was equal to or higher than 15N/25 mm, the grade of the adhesion strength was expressed by G1. When the strength was lower than 15N/25 mm and not lower than 10N/25 mm, the grade was expressed by G2. When the strength was lower than 10N/25 mm and not lower than 5N/25 mm, the grade was expressed by G3. When the strength was lower than 5N/25 mm, the grade was expressed by G4. If the strength is of grade G4, such a metallically decorated sheet can not be put to practical use because of low adhesion strength.

[Moldability]

Figure 2A:
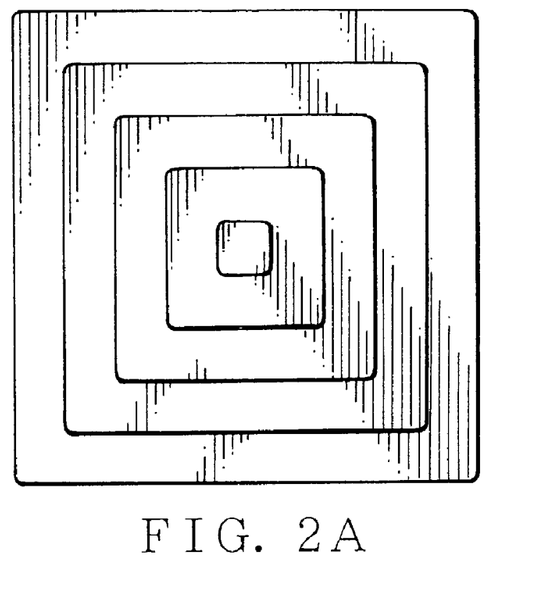
FIG. 2A is a top view illustrating a mold α used to evaluate a metallically decorated sheet in EXAMPLES.
Figure 2B:
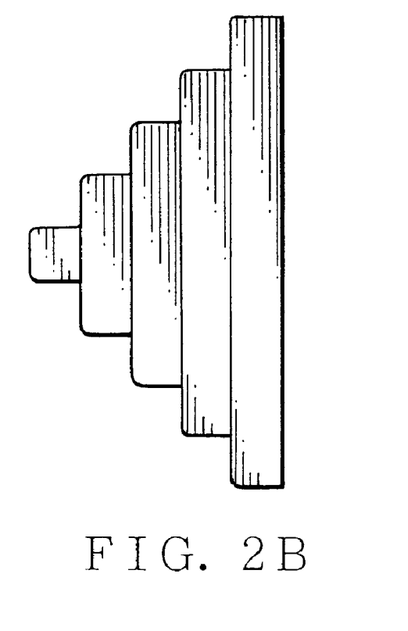
FIG. 2B is a side view illustrating a mold α used to evaluate a metallically decorated sheet in EXAMPLES.
Figure 3A:
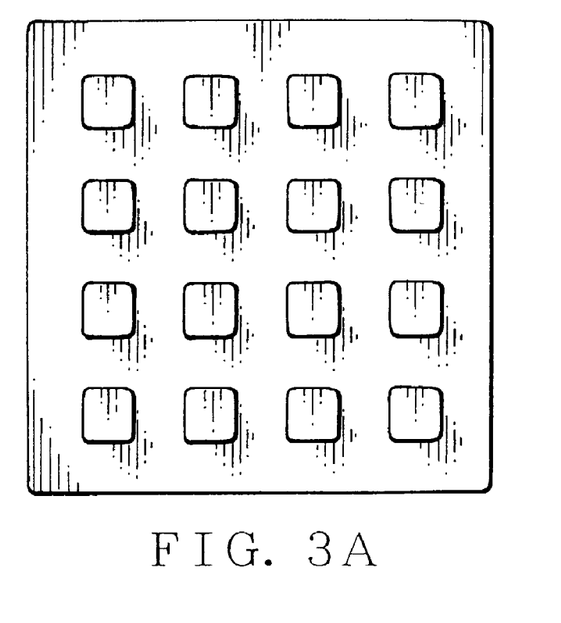
FIG. 3A is a top view illustrating a mold β used to evaluate a metallically decorated sheet in EXAMPLES.
Figure 3B:
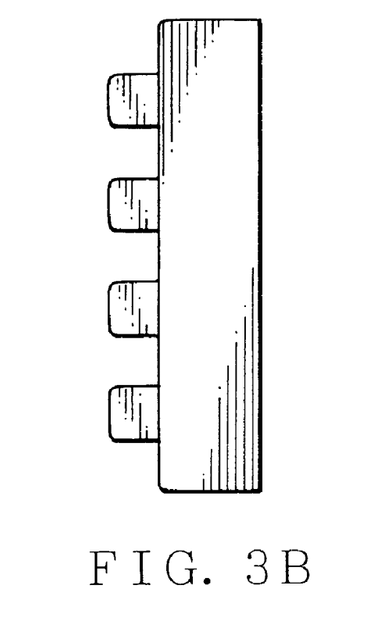
FIG. 3B is a side view illustrating a mold β used to evaluate a metallically decorated sheet in EXAMPLES.

As for the evaluation of the moldability, the metallically decorated sheets A-N were vacuum molded by using two types of molds, that is, mold α shown in FIGS. 2A and 2B, and mold β shown in FIGS. 3A and 3B, thereby the molded products were obtained.

The moldability of the molded product was evaluated by visual observation and classified into three grades form G1 to G3. That is, when the product was molded in accordance with the shape of the mold in fine detail, the grade of the moldability of the molded product was expressed by G1. When the product was not well molded at the corner portion, the grade was expressed by G2. When the product was not well molded in terms of projections and hollows of the mold, the grade was expressed by G3.

[Appearance of the Molded Product]

The metallic luster of the molded product was evaluated by visual observation and classified into three grades form G1 to G3. That is, when the product had metallic luster in fine detail, the grade of the appearance of the molded product was expressed by G1. When the product had deteriorated metallic luster at the corner portion, the grade was expressed by G2. When the product had significantly deteriorated metallic luster at the corner portion, the grade was expressed by G3.

[Weather Resistance]

The weather resistance of the molded product, which had been subjected to a weather resistance test for 500-2000 hours in accordance with JIS K6732 9.6, was evaluated by visual observation and classified into four grades form G1 to G4. That is, when the molded product did not show discoloration or film-separation after the weather resistance test for 2000 hours, the grade of the weather resistance of the molded product was expressed by G1. When the molded product did not show discoloration or film-separation after the test for 1000 hours, the grade of the molded product was expressed by G2. When the molded product did not show discoloration or film-separation after the test for 500 hours, the grade of the molded product was expressed by G3. When the molded product showed discoloration or film-separation after the test for 500 hours, the grade of the molded product was expressed by G4.

[Chemical Resistance]

The chemical resistance of the molded product, which was subjected to a chemical resistance test in accordance with JIS K6744 7.5, was evaluated and classified into four grades form G1 to G4. That is, when the molded product did not show a change with all kinds of solvent, the grade of the chemical resistance of the molded product was expressed by G1. When the molded product showed discoloration or film-separation with some kinds of solvent, the grade of the molded product was expressed by G2. When the molded product showed discoloration or film-separation with half kinds of solvent, the grade of the molded product was expressed by G3. When the molded product showed discoloration or film-separation with more than half kinds of solvent, the grade of the molded product was expressed by G4.

[Surface Hardness]

The surface hardness of the molded product was evaluated by a pencil scratch test in accordance with JIS K5400 8.4. That is, the surface hardness was expressed by the highest pencil hardness, with which no scratch occurs for the molded product. Although it depends on a use of the molded product of course, the pencil hardness equal to or lower than HB generally seems to be insufficient surface harness.

[Scratch Resistance]

The surface of the molded product was scrubbed twenty times as reciprocating motion with a nylon brush (a brush made of polyamide) under load of 0.5 kg. Then, the scratch resistance was evaluated by visually observing the state of the surface of the molded product and classified into four grades form G1 to G4. That is, when the surface of the molded product had no scratch, the grade of the scratch resistance of the molded product was expressed by G1. When the surface had a trace of scratch, the grade of the molded product was expressed by G2. When the surface had thin scratches, the grade of the molded product was expressed by G3. When the surface had clear scratches, the grade of the molded product was expressed by G4.

The results of evaluation are listed in Tables 1A and 1B (metallically decorated sheets A to H of the present invention) and Tables 2A and 2B (ordinary metallically decorated sheets I to N: comparative examples).

Tables 1A, 1B, 2A and 2B reveal that the metallically decorated sheet of the present invention is excellent compared with the ordinary metallically decorated sheet as the comparative example in terms of the adhesion property of the deposited metallic layer, moldability, appearance of the molded product after molding, weather resistance, chemical resistance, surface hardness and scratch resistance.

With the metallically decorated sheet of the present invention, the cost down in production is possible, a relatively deep drawing can be carried out without a problem upon molding, and the design performances and good scratch resistance can be easily attained. That is, the metallically decorated sheet of the present invention is excellent in terms of productivity, moldability and appearance.

Further, the metallically decorated sheet intermediate of the present invention can be produced in a lot in advance and then, the metallically decorated sheet intermediate can simply be adhered to a surface film layer, which is adjusted in terms of various performances (e.g. scratch resistance, design and color) according to the demand from a customer, so as to easily produce the metallically decorated sheet. That is, there is no need to prepare a variety of metallically decorated sheets in order to meet every demand from customers, therefore the time for controlling the stock, a cost of stock and a risk of stock can be significantly reduced.

What is claimed is:

1. A metallically decorated sheet for adding metallic appearance to a surface of an article, said sheet comprising in the following sequence:
- a transparent or translucent surface film layer;
- a first adhesive layer;
- a transparent or translucent holding film layer having a metallic layer formed on only one side thereof;
- a second adhesive layer; and
- a base film layer consisting of thermoplastic resin, wherein said sheet has a surface hardness expressed by pencil hardness of from F to 2H and the metallic layer has a thickness between 20 nm and 100 nm, wherein the metallic layer is formed on the same side of the holding film layer as the base film layer, wherein the holding film layer consists of a polyester polymer compound having a benzene ring and naphthalene ring in a main chain or a polyester polymer compound having a benzene ring and cyclohexane ring in a main chain.

2. The metallically decorated sheet according to claim 1, wherein the holding film layer is equal to or less than 40 μm in thickness.

3. The metallically decorated sheet according to claim 2, wherein the surface film layer consists of acrylic film.

4. The metallically decorated sheet according to claim 1, wherein the surface film layer consists of acrylic film.

5. The metallically decorated sheet according to claim 1, further comprising an article having a surface to which the metallically decorated sheet is attached so as to provide a metallic appearance to the surface.

6. An intermediate molded product of the metallically decorated sheet according to claim 1, wherein the metallically decorated sheet is at least similarly formed in a shape of an inner wall of a molding cavity by heat forming, wherein said intermediate molded product is inserted into a molding cavity as an insert mold to produce a finished product by injection molding so that the intermediate molded product is formed into an integral part of the finished product after said injection molding.

7. A molded finished product having a metallic appearance produced by injection molding, wherein an intermediate molded product is inserted in a molding cavity and subjected to injection molding, said intermediate molded product is formed into at least a similar shape to an inner wall of the molding cavity by heat forming the metallically decorated sheet of claim 1.

* * * * *